United States Patent [19]

Proctor

[11] Patent Number: 4,624,112
[45] Date of Patent: Nov. 25, 1986

[54] AUTOMOTIVE AIR CONDITIONER CHARGING STATION WITH OVER-RIDE CONTROLS

[75] Inventor: Robert H. Proctor, Baltimore, Md.
[73] Assignee: Murray Corporation, Cockeysville, Md.
[21] Appl. No.: 769,961
[22] Filed: Aug. 26, 1985
[51] Int. Cl.[4] .............................................. F25B 45/00
[52] U.S. Cl. ........................................ 62/149; 62/292
[58] Field of Search ................. 62/149, 292, 77, 174, 62/126, 127, 192, 468

[56] References Cited

U.S. PATENT DOCUMENTS

| | | | |
|---|---|---|---|
| 2,499,170 | 2/1950 | Shoemaker | 62/292 X |
| 3,303,663 | 2/1967 | Miller et al. | 62/149 |
| 3,400,552 | 9/1968 | Johnson et al. | 62/149 |
| 3,695,055 | 10/1972 | Bruce | 62/157 |
| 3,785,163 | 1/1974 | Wagner | 62/77 |
| 3,873,289 | 3/1975 | White | 62/149 |
| 4,245,480 | 1/1981 | Saunders | 62/149 |
| 4,261,178 | 4/1981 | Cain | 62/149 |
| 4,285,206 | 8/1981 | Koser | 62/126 |
| 4,364,236 | 12/1982 | Lower et al. | 62/77 |
| 4,513,578 | 4/1985 | Proctor et al. | 62/149 |

Primary Examiner—Harry Tanner
Attorney, Agent, or Firm—Irvin A. Lavine

[57] ABSTRACT

An air conditioner charging station includes oil and refrigerant reservoirs, a vacuum pump, and an electronic sequencing unit. A header conduit connected to the reservoirs and vacuum pump is connected to a cross-over conduit, which in turn is connected to conduits extending to the high and low pressure sides of an air conditioner compressor. Electrically operated valves are provided in the cross-over conduit, in a dump conduit connected to the cross-over conduit, and in branch conduits connected to the reservoirs and to the vacuum pump. An over-ride control of the cross-over valve is provided, responsive to the pressure of the high pressure side and an over-ride control is provided for cross-over valve, activated if the ambient temperature is below a predetermined level. An excessively high pressure in the high pressure side causes the closing of the valve in the refrigerant reservoir branch conduit.

23 Claims, 1 Drawing Figure

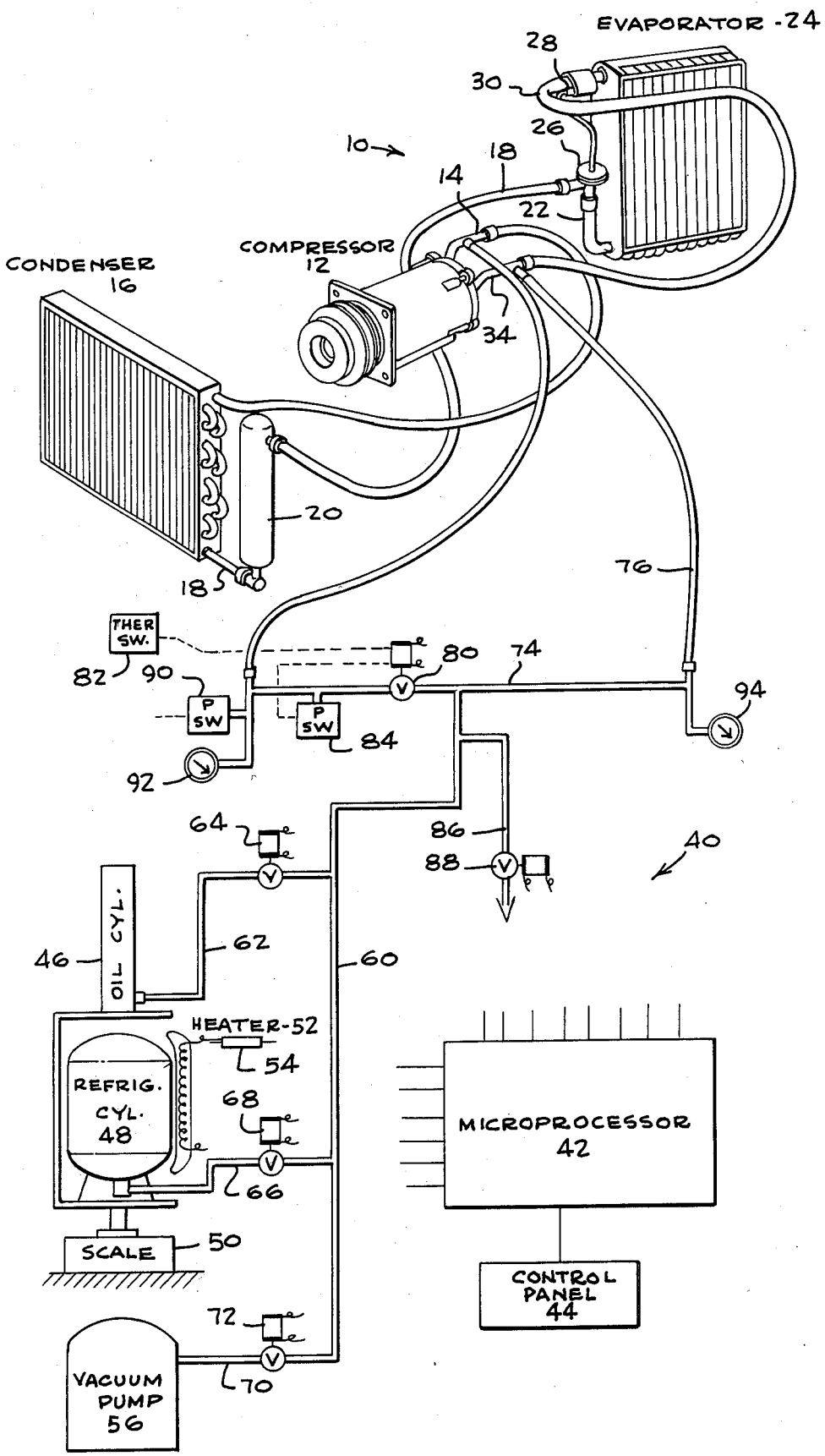

AUTOMOTIVE AIR CONDITIONER CHARGING STATION WITH OVER-RIDE CONTROLS

BACKGROUND OF THE INVENTION

The present invention relates to an automatic air conditioner charging station for charging refrigerant and oil into air conditioner systems, particularly automotive air conditioner systems.

There have been provided systems for automatically charging, in the proper sequence, and in appropriate amounts, oil and refrigerant to automotive air conditioner systems. In Proctor, et al. U.S. Pat. No. 4,513,578, there is disclosed an air conditioner charging station having a weighing scale on which are mounted reservoirs for oil and refrigerant. An electronic sequencing unit in the form of a computer module senses the weight loss of the reservoirs as first the oil is charged into the air conditioner and then refrigerant is charged into the air conditioner. The apparatus disclosed in this patent has provision for entering into the computer the required amount of oil and refrigerant for the particular air conditioner unit being serviced, and then charges the oil and refrigerant sequentially and in the amounts commanded or entered into the memory of the computer.

Wagner, U.S. Pat. No. 3,785,163 discloses apparatus for charging an air conditioner system including a conduit having one end connected to a valve to which is connected a refrigerant container, the other end of the conduit connected to a manifold, the manifold providing a pair of discharge passages, one for connection to the high pressure side of the compressor and the other to the low pressure side of the compressor, with individual control valves for each of the passages.

White, U.S. Pat. No. 3,873,289 provides an air conditioner charging system with connections to the high pressure side and low pressure side of a compressor, with refrigerant and oil being charged to the low pressure side of the compressor. In addition, a dump line is provided, connected to the high pressure side of the compressor.

Koser, U.S. Pat. No. 4,285,206 provides an automatic refrigerant charging system which includes a microprocessor and a key board for inputting data, and further provides for evacuation from both the high and low pressure sides of the compressor as well as for the charging to both the high and low pressure sides of the compressor.

Cain, U.S. Pat. No. 4,261,178 is a further disclosure of a system for evacuating from both the high and low pressure sides of a compressor.

Lower, et al., U.S. Pat. No. 4,364,236 provides a high pressure switch which is employed as a safety device for terminating the operation of a metering pump delivering refrigerant to the compressor in the event that a valve is closed on the outlet side of the pump, which valve should have been opened. This patent also discloses the utilization of a heater and heat control for a refrigerant container.

Bruce, U.S. Pat. No. 3,695,055 provides an air conditioner charging system in which there is provision for sensing the temperature of the refrigerant being pumped, the sensed temperature, if too low, causing a shut off of the feeding of refrigerant.

Saunders, U.S. Pat. No. 4,245,480 utilizes, in a refrigerant charging system, signals representative of indoor and outdoor temperature, which are supplied to a super heat reference circuit which generates a desired super heat signal.

A number of problems have arisen in the operation of automatic air conditioner charging stations. For example, where a manual dump valve have been provided, it is sometimes permitted to remain open by the operator during the charging cycle, resulting in an insufficient quantity of refrigerant reaching the compressor. Further, in some of these units, the speed of evacuation and the speed of charging have been unacceptably slow.

When a partial or supplementary charge is being delivered, the mechanic may find it necessary to start the automobile engine to create a lower pressure on the low pressure side of the compressor in an attempt to draw more refrigerant from the refrigerant supply container. In this situation, there will occur refrigerant circulation from the high pressure side to the low pressure side of the compressor through the interconnection, or cross-over, without delivery of refrigerant from the refrigerant supply container into the air conditioner.

Another problem which has been noted is that upon discharging of an air conditioner where the pressure in the high side of the system is excessively high, for example is 120 psig or above, there results an excessively fast discharge of fluid, there being discharged not only refrigerant, but also oil from the air conditioner. When the oil is discharged, the system foams since the dissolved refrigerant boils off. This is highly undesirable.

SUMMARY OF THE INVENTION

An air conditioner charging station is provided, having an electronic sequencing unit, and provision for charging selected amounts of refrigerant and oil into an air conditioner, there being provided conduits connected to the high and low pressure sides of the compressor, a cross-over conduit between them, and a dump conduit connected to the cross-over conduit. The dump conduit is provided with an electrically controlled dump valve which automatically deactivates the sequencing unit during the dump mode; however, in the dump mode if the pressure in the high side pressure is excessive, an over-ride control causes the cross-over valve to be closed. During refrigerant dumping, evacuation and charging, the pressure of the high pressure side is monitored and an over-ride causes closing of the cross-over valve if the high pressure side pressure is above a preselected limit. Further, during refrigerant charging, the refrigerant is normally charged to both the high and low pressure sides; however, if the ambient temperature is below a predetermined level, charging to the high pressure side is halted, while the charging to the low pressure side is continued.

Among the objects of the present invention is the provision of an automatic air conditioner charging station which will avoid a dump valve being left in the open position through inadvertence, which will provide for improved speed of dumping, evacuation and charging of the air conditioner and which will avoid the necessity for the mechanic to start the automobile engine to run the compressor during charging of an evacuated air conditioner system.

Other objects of the present invention are to provide an automatic air conditioner charging station which will provide for interconnection between the high and low pressure sides during dumping, evacuation and refrigerant charging, and which, in addition, will close any such interconnection or cross-over during oil charging, so that during oil charging, oil is charged only into the low pressure side of the compressor. Yet another object of the present invention is to provide an interconnection between the high and low pressure sides, together with means to close said interconnection if either the pressure in the high side pressure is above a predetermined level, or ambient temperature is below a predetermined level.

Yet another object is to cause charging of refrigerant to be automatically stopped if the pressure of the high pressure side is greatly excessive, and remain stopped until a manual signal is given.

Other objects and many of the attendant advantages of the present invention will be readily understood from consideration of the following specification and claims.

BRIEF DESCRIPTION OF THE DRAWING

The single FIGURE of the drawing is partly schematic and representational, showing a conventional air conditioner, and a charging station and related conduits in accordance with the present invention.

DESCRIPTION OF THE PREFERRED EMBODIMENT

Referring now to the drawing, there is shown a conventional air conditioner generally designated 10, such as is typically used in automobiles. The air conditioner 10 includes a compressor 12 having a high pressure side which includes a discharge conduit 14 which is connected to condenser 16. The discharge conduit 18 of condenser 16 may pass through a receiver-dryer 20, and is connected to the inlet conduit 22 of evaporator 24 through expansion valve 26. Expansion valve 26 is controlled in known manner by a temperature sensing element 28 attached to the suction conduit 30 extending from evaporator 24 to the low pressure conduit 34 of compressor 12.

The air conditioner charging station in accordance with the present invention is mounted in a mobile cabinet, which contains in it or supports on it the various component parts of the system as disclosed in the drawing. Thus, the air conditioner charging system 40 in accordance with the present invention includes a micro processor 42 which is an electronic sequencing unit, which is capable of receiving various electrical signals, processing them and issuing signals, in accordance with a predetermined sequence. A control panel 44 is provided, being generally similar to the control panel disclosed in Proctor, et al., U.S. Pat. No. 4,513,578, and having provision for inputting signals for the desired amounts of refrigerant and oil which are to be charged into the air conditioner 10. The air conditioner charging station 40 further includes a reservoir 46 for oil and a reservoir 48 for refrigerant, both in the form of cylinders of known construction. The oil reservoir 46 and refrigerant reservoir 48 are both supported on a scale 50 which weighs the combined weight of the two reservoirs and their contents, and provides a signal to the electronic sequencing unit or micro processor 42 representative of that weight. As the weight on scale 50 decreases, that is, is "lost" from one of the reservoirs, during oil or refrigerant discharge, a signal representative of the substantially instantaneous weight is provided to the micro processor 42 so that the micro processor 42 is enabled to determine the amount of oil or refrigerant discharged, and to compare it to a predetermined, pre-set amount, and to send an appropriate signal when the predetermined amount of the particular fluid has been discharged.

The refrigerant reservoir 48 is provided with a heater 52 to heat reservoir 48, and a thermostat 54 to limit the temperature of refrigerant in reservoir 48; this, in turn, limits the pressure to approximately 100 psig. The heater 52 is energized when the charging station 40 is turned on, and by vaporizing a part of the refrigerant in refrigerant reservoir 48, increases the pressure in it so as to achieve a high rate of discharge of refrigerant.

A vacuum pump 56 of known construction is also provided.

A header conduit 60 is provided from which extend an oil reservoir branch conduit 62 with an electrically controlled valve 64 therein; a refrigerant reservoir branch conduit 66 with an electrically controlled valve 68 therein; and a vacuum pump branch conduit 70 with an electrically controlled valve 72 therein. The header conduit 60 has an end which is fluid connected to a cross-over conduit 74, one end of which is connected to a low pressure conduit 76, and the other end of which is connected to a high pressure conduit 78. Low pressure conduit 76 and high pressure conduit 78 are connected to the low pressure side and high pressure side, respectively, of the compressor 12.

In cross-over conduit 74, between the juncture therewith of header conduit 60 and its connection to the high pressure conduit 78 is an electrically controlled cross-over valve 80. Cross-over valve 80 will pass refrigerant at pressures up to 120 psig. A device for sensing the ambient temperature, such as thermal switch 82, is provided, and is electrically connected to the electrically controlled cross-over valve 80. A pressure switch 84 is in the cross-over conduit 74 between cross-over valve 80 and the connection of cross-over conduit 74 to the high pressure conduit 78; pressure switch 84 is electrically connected to cross-over valve 80 and is activated at a pressure of approximately 120 psig. An electrically activated dump valve 88 is in a dump conduit 86, one end of which is connected to the header conduit 60; as will be apparent, the dump conduit 86 may also be connected to the cross-over conduit 74, between cross-over valve 80 and the connection of cross-over conduit 74 and low side conduit 76.

A pressure switch 90 is fluid connected with the high pressure conduit 78 and electrically connected with micro-processor 42; it is activated at a pressure of 320–370 psig. A high side pressure gauge 92 is also connected with the high side through high pressure conduit 78; similarly, a gauge 94 is connected to the low pressure side through low pressure conduit 76.

Each of the oil reservoir branch conduit valve 64, refrigerant reservoir branch conduit valve 68, vacuum pump branch conduit valve 72, cross-over valve 80 and dump valve 88 is electrically connected to the micro processor 42. In known manner as will be hereinafter discussed, these valves of the charging station 40 are positioned in open or closed position in accordance with signals from the micro processor or electronic sequencing unit 42, except that such signal to the cross-over valve 80 may be over-ridden, as hereinbelow set forth.

In operation, the main switch (not shown) controlling the supply of current to the air conditioner charging station 40 is closed, thereby energizing the heater 52 for refrigerant reservoir or cylinder 48 so that there is a pressure therein of about 100 psig. Signals representative of the amount of oil and refrigerant to be charged into the air conditioner 10 are entered into the micro processor 42.

The "start" button of the charging station 40 is depressed where upon micro processor 42 effects the dumping or discharging of the air conditioner 10 by opening the dump valve 88 and cross-over valve 80; valves 64, 68 and 72 are closed since valve-opening signals to these valves are blocked when cross-over valve 80 is open. Under normal conditions, the refrigerant and oil from the air conditioner 10 pass through the high and low pressure conduits 76 and 78, cross-over conduit 74 and into the dump conduit 86 at a rapid rate. The discharged fluids may be collected in known manner.

The pressure in the high pressure side of the compressor 12, that is, the pressure in the high pressure side discharge conduit 14, will be conducted by the high pressure conduit 78 and will be sensed by the pressure switch 84. If the high pressure side pressure is in excess of a predetermined amount, that is, in excess of 120 psig, an over-ride signal will be transmitted to the cross-over valve 80. This will stop the dumping of refrigerant and oil from the high pressure side of compressor 12 until such time as the pressure has been reduced to a satisfactory level, which is at or below 120 psig. Then cross-over valve 80 will open effecting dumping from the high pressure side in addition to the dumping from the low pressure side, for more rapid dumping. Thus there is achieved rapid dumping or discharge of the air conditioner 10, with the avoidance of undesirable violent discharge which would occur at a pressure above 120 psig.

Evacuation of air conditioner 10 is effected following dumping of fluid, this being accomplished by the micro processor 42 closing the dump valve 88, and opening cross-over valve 80 and vacuum pump branch conduit valve 72, and energizing the vacuum pump 56. After the evacuation step or phase, the micro processor 42 causes the dump valve 88 to remain closed, the vacuum pump 56 is not energized, vacuum branch conduit valve is closed, and cross-over valve 80 is also closed.

Oil in the required amount is charged into the low pressure side of compressor 12 in the next step, the oil reservoir branch conduit valve 64 being opened, and all other valves remaining closed. The amount of oil charged is determined by weight loss, by scale 50 and the micro processor 42, and after the proper amount of oil has been charged into the air conditioner 10, a "chase" amount of refrigerant may be provided, to chase the oil through header conduit 60, a part of cross-over conduit 74 and low pressure conduit 76.

The refrigerant charge is next delivered, and is delivered to both the high and low pressure sides of compressor 12; the refrigerant reservoir branch conduit valve 68 and the cross-over valve 80 are opened, and all other valves are closed. Should the pressure in the high pressure side of air conditioner 10 exceed 120 psig, an over-ride signal from the pressure switch 84 will be transmitted to the cross-over valve 80 to close it to thereby stop the charging of refrigerant to the high pressure side of the air conditioner 10. The cross-over valve 80 will be closed irrespective of the signal from micro processor 42. Additionally, if the ambient temperature is at or below a predetermined level, i.e., 70° F., the thermal switch 82 will provide an over-ride signal to the electrically controlled cross-over valve 80, which will over-ride the signal from micro processor 42, and cause the cross-over valve 80 to be closed, such closing occurring irrespective of the signal received by valve 80 from micro processor 42. As a consequence, at temperatures below 70° F. refrigerant will be charged to the low pressure side of compressor 12 only, and not to the high pressure side, charging being through the header conduit 60, a part of the cross-over conduit 74 and the low pressure side conduit 76.

If the pressure in the high pressure side is greatly excessive, and reaches 320–370 psig, the pressure switch 90 will be activated, thereby sending a signal to the micro processor 42, which will immediately stop the changing of refrigerant into the air conditioner 10 by closing the refrigerant reservoir branch conduit valve 68. An alarm is sounded and a "hold" button is illuminated, also. The mechanic checks the air conditioner 10, and after reducing the pressure in the high pressure side, presses the "hold" button to recommence the charging, to complete the adding of the selected amount of refrigerant into the air conditioner 10.

When a partial charge is to be delivered to the air conditioner 10, or where it is desired to diagnose it, the compressor 12 is activated by operating the engine of the automobile, so as to reduce the pressure in the low pressure side of the air conditioner 10. The compressor 12 will generate a pressure in the high pressure side of 120 psig or more, if the ambient temperature is above 70° F.: consequently, cross-over valve 80 will be closed due to the over-ride signal provided by pressure switch 84. As a result, there is prevented by-passing of refrigerant from the high pressure side of the compressor 12 through high pressure conduit 78, cross-over conduit 74, and low pressure conduit 76; there is also prevented blocking of the supply of additional refrigerant from the refrigerant cylinder 48 due to the lower pressure therein, which is at most about 100 psig, compared to the pressure of 120 psig generated by compressor 12. In contrast, if the ambient temperature is below 70° F., the compressor 12 may generate a pressure less than 120 psig; in this case, the thermal switch 82 provides an over-ride signal which causes the cross-over valve 80 to close, thereby preventing the above noted refrigerant by-pass and preventing the possible blocking of the supply of additional refrigerant from the refrigerant cylinder 48, if the pressure in the high pressure side is greater than the pressure in refrigerant cylinder 48. In the diagnostic mode, the closing of the cross-over valve 80 due to a high pressure side pressure of 120 psig or more, or to an ambient temperature of less than 70° F. will prevent a mis-diagnosis of a problem in the air conditioner 10.

There has been provided an improved air conditioner charging station, which permits rapid dumping and evacuation, and rapid charging, through connection of conduits to both high and low pressure sides of the air conditioner. The herein disclosed charging station avoids mishaps due to failure to close the dump valve after the dumping step, and avoids the necessity, in most charging operations, for the mechanic to start the engine of the automobile in order to run the compressor.

In addition, dumping of the fluids from the high side of the air conditioner compressor when the high pressure side pressure is in excess of a predetermined level is prevented through an over-ride of the electrically operated cross-over valve. Charging of refrigerant to the high pressure side is halted if pressure on the high pressure side of the compressor is in excess of a predetermined amount, and the charging of refrigerant to the high side of the air conditioner is halted when the ambient temperature is below a predetermined amount.

Additionally, at excessively high pressures on the high pressure side, discharging of refrigerant from the refrigerant reservoir is prevented.

It will be obvious to one skilled in the art that various changes may be made without departing from the spirit of the invention, and therefore the invention is not limited to what is shown in the drawings, and described in the specification, but only as indicated in the appended claims.

I claim:

1. In an air conditioner charging station for evacuating and subsequently charging an air conditioner which includes a compressor having high and low pressure sides, and wherein the charging station includes oil and refrigerant reservoirs and a vacuum pump;
   (a) an electrically operated dump valve,
   (b) conduits for connecting said oil reservoir, said refrigerant reservoir, said vacuum pump and said dump valve to the high and low pressure sides of said air conditioner,
   (c) electrically operated valve means in said conduits, and
   (d) electronic sequencing means connected with said electrically operated valves for generating signals for sequentially connecting:
      (i) said dump valve to said high and low pressure sides of the compressor for dumping fluid from said high and low pressure sides,
      (ii) said vacuum pump to said high and low pressures sides of the compressor for evacuating fluid from said high and low pressure sides,
      (iii) said oil reservoir only to said low pressure side, and
      (iv) said refrigerant reservoir simultaneously to said high and low pressure sides of the compressor.

2. The air conditioner charging station of claim 1, wherein said conduits include a high pressure side conduit and a low pressure side conduit for connection to the high and low pressure sides of the compressor, respectively, and a cross-over conduit connected to said high pressure side and low pressure side conduits.

3. The air conditioner charging station of claim 2, and a said electrically operated valve in said cross-over conduit.

4. The air conditioner charging station of claim 3, wherein said conduits further include a header conduit, branch conduits connected to said header conduit and to said oil reservoir, said refrigerant reservoir and said vacuum pump, respectively, and a said electrically operated valve means in each of said branch conduits.

5. The air conditioner charging station of claim 4, wherein a dump conduit having said dump valve therein is connected to said header conduit.

6. The air conditioner charging station of claim 3, and further comprising means for sensing the ambient temperature and for causing said cross-over valve to close or to remain closed when the ambient temperature is below a predetermined level, irrespective of signals of said electronic sequencing means to said cross-over valve during the refrigerant charging mode.

7. The air conditioner charging station of claim 3, and further comprising means for closing or maintaining closed said valve means in said cross-over conduit when the high pressure side pressure exceeds a predetermined amount.

8. The air conditioner charging station of claim 7, said last mentioned means comprising means for sensing the pressure at the high pressure side of the compressor and for closing or maintaining closed the cross-over valve means in the cross-over conduit when the pressure sensed is above a predetermined amount.

9. The air conditioner charging station of claim 1, and further comprising means for preventing charging of refrigerant when an excessively high pressure in the high pressure side is present.

10. The air conditioner charging system of claim 9, said last mentioned means comprising means for sensing the pressure in the high pressure side, and means including said electronic sequencing means for closing said refrigerant reservoir branch conduit valve.

11. The air conditioner charging station of claim 1, and means for heating said refrigerant reservoir.

12. The air conditioner charging system of claim 11, said last mentioned means comprising an electric blanket, and means for connecting said electric blanket to a source of electric energy.

13. The air conditioner charging system of claim 1, said dump valve having a size to accomodate refrigerant discharge to atmosphere at a pressure of up to approximately 120 psig without undue velocity.

14. An air conditioner charging station for supplying a charge of refrigerant to an air conditioner having high and low pressure sides, said charging station comprising:
   (a) a refrigerant reservoir,
   (b) a conduit for connection to the high pressure side of the air conditioner,
   (c) a second conduit for connection to the low pressure side of the air conditioner,
   (d) a cross-over conduit connecting said first and second conduits,
   (e) a cross-over valve in said cross-over conduit,
   (f) a delivery conduit connected to said refrigerant reservoir and to said cross-over conduit between said cross-over valve and said second conduit, and
   (g) ambient temperature responsive means for closing said cross-over valve when the ambient temperature is below a predetermined level.

15. The air conditioner charging station of claim 14, said cross-over valve being electrically operated, and further comprising:
   (a) an oil reservoir,
   (b) a branch conduit including an electrically operated valve connecting the oil reservoir to said delivery conduit,
   (c) a branch conduit connecting said refrigerant reservoir to said delivery conduit and having an electrically operated valve therein, and
   (d) electronic sequencing means connected to said electrically operated valves for sequentially connecting:
      (i) said oil reservoir only to said low pressure side, by opening the valve in the oil reservoir branch conduit and closing said other valves, and
      (ii) said refrigerant reservoir to said air conditioner by opening the said refrigerant reservoir branch conduit valve, closing the oil reservoir branch conduit valve, and permitting the opening of the said cross-over valve.

16. The air conditioner charging station of claim 14, and further comprising means for preventing charging of refrigerant upon an excessively high pressure in the high pressure side.

17. The air conditioner charging station of claim 15, said last mentioned means comprising means for sensing the pressure in the high pressure side, and means including said sequencing means for connecting said sensing means to said refrigerant reservoir branch conduit valve.

18. The air conditioner charging system of claim 14, and further comprising means for closing said crossover valve upon excess pressure in the high pressure side.

19. An air conditioner charging station for supplying a charge of refrigerant to an air conditioner having high and low pressure sides, said charging station comprising:
- (a) a refrigerant reservoir,
- (b) a conduit for connection to the high pressure side of the air conditioner,
- (c) a second conduit for connection to the low pressure side of the air conditioner,
- (d) a delivery conduit,
- (e) means for connecting said delivery conduit to said first and second conduits,
- (f) means for connecting said delivery conduit to said refrigerant reservoir,
- (g) valve means for controlling flow of fluid through only said first mentioned conduit, and
- (h) ambient temperature responsive means for closing said valve means upon the occurrence of an ambient temperature below a predetermined level, whereby fluid flow in the first conduit is prevented so as to permit charging only to the low pressure side.

20. An air conditioner charging station in accordance with claim 19, and further comprising a dump valve, and means for connecting said dump valve to said delivery conduit.

21. An air conditioner charging station for supplying a charge of refrigerant to an air conditioner having high and low pressure sides, said charging station comprising:
- (a) a refrigerant reservoir,
- (b) a conduit for connection to the high pressure side of the air conditioner,
- (c) a second conduit for connection to the low pressure side of the air conditioner,
- (d) a delivery conduit,
- (e) means for connecting said delivery conduit to said first and second conduits,
- (f) means for connecting said delivery conduit to said refrigerant reservoir,
- (g) valve means for controlling flow of fluid through only said first mentioned conduit, and
- (h) means for operating said valve means for preventing flow of fluid in said first mentioned conduit when a predetermined high pressure is present in the high pressure side of the air conditioner.

22. An air conditioner charging station as set forth in claim 21, said last mentioned means comprising means for sensing the pressure in the high pressure side, and for closing said valve means upon the occurrence of such predetermined high pressure.

23. An air conditioner charging station in accordance with claim 21, and further comprising a dump valve, and means for connecting said dump valve to said delivery conduit.

* * * * *